United States Patent
Paczuski

(10) Patent No.: US 6,527,085 B1
(45) Date of Patent: Mar. 4, 2003

(54) LUBRICATING SYSTEM FOR COMPRESSOR

(75) Inventor: Andrew W. Paczuski, Adrian, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/712,366

(22) Filed: Nov. 14, 2000

(51) Int. Cl.[7] .............................. F01M 1/00; F01M 1/10
(52) U.S. Cl. .................... 184/6.16; 418/55.6; 184/6.18; 184/6.24
(58) Field of Search .............................. 184/6.16, 6.18, 184/6.24; 417/407, 372, 368; 418/55.5, 55.6, 91, 83, 89

(56) References Cited

U.S. PATENT DOCUMENTS

| | | | | |
|---|---|---|---|---|
| 1,991,623 A | * | 2/1935 | Onsrud ........................ 384/465 |
| 2,178,425 A | | 10/1939 | Johnson ....................... 417/228 |
| 3,194,490 A | | 7/1965 | Roelsgaard .................. 415/88 |
| 3,674,382 A | * | 7/1972 | Kubota et al. ............... 184/6.18 |
| 3,692,435 A | | 9/1972 | Iida et al. .................... 417/372 |
| 3,767,013 A | * | 10/1973 | Caldwell ..................... 184/6.18 |
| 3,830,341 A | * | 8/1974 | Davies et al. ............... 184/6.16 |
| 3,848,702 A | | 11/1974 | Bergman ..................... 184/6.3 |
| 4,406,594 A | | 9/1983 | Smaby et al. ............... 417/368 |
| 4,568,256 A | | 2/1986 | Blain ........................... 418/55.6 |
| 4,575,320 A | | 3/1986 | Kobayashi et al. ......... 418/55.6 |
| 4,623,306 A | * | 11/1986 | Nakamura et al. .......... 418/55 |
| 4,724,928 A | | 2/1988 | Lewis et al. ................ 184/6.18 |
| 4,764,086 A | * | 8/1988 | Jesinger ...................... 277/369 |
| 4,838,769 A | | 6/1989 | Gannaway .................. 417/312 |
| 4,842,492 A | | 6/1989 | Gannaway .................. 417/312 |
| 4,875,838 A | | 10/1989 | Richardson, Jr. ........... 418/55.4 |
| 4,875,840 A | * | 10/1989 | Johnson et al. ............. 184/6.18 |
| 4,907,951 A | * | 3/1990 | Wisner ........................ 184/6.24 |
| 5,007,808 A | | 4/1991 | Fraser, Jr. et al. .......... 417/368 |
| 5,087,170 A | * | 2/1992 | Kousokabe et al. ........ 184/6.16 |
| 5,131,828 A | * | 7/1992 | Richardson et al. ........ 418/151 |
| 5,176,506 A | * | 1/1993 | Siebel ......................... 417/368 |
| 5,236,318 A | | 8/1993 | Richardson, Jr. ........... 418/1 |
| 5,288,211 A | | 2/1994 | Fry ............................. 417/312 |
| 5,445,504 A | * | 8/1995 | Iwamura et al. ............ 184/6.18 |
| 5,762,164 A | | 6/1998 | Krueger et al. ............. 184/6.18 |
| 5,785,151 A | * | 7/1998 | Fry et al. .................... 184/6.16 |
| 5,795,140 A | | 8/1998 | Jin .............................. 417/372 |
| 5,865,607 A | | 2/1999 | Fukuoka ..................... 418/46 |
| 5,884,727 A | | 3/1999 | Ryu ............................ 184/6.3 |
| 5,980,222 A | | 11/1999 | Fry ............................. 417/553 |

* cited by examiner

*Primary Examiner*—Jack Lavinder
*Assistant Examiner*—Melody M. Burch
(74) *Attorney, Agent, or Firm*—Baker & Daniels

(57) ABSTRACT

A compressor assembly including a housing, a compression mechanism disposed in the housing, a sump located in the housing, the sump containing liquid lubricant, a conduit extending between the compression mechanism and the sump, the compression mechanism and the sump being in fluid communication through the conduit, lubricant in the sump being provided to the compression mechanism through the conduit, and a reservoir containing liquid lubricant located between the compression mechanism and the sump. The reservoir is in fluid communication with the conduit, and the compression mechanism and the reservoir are in fluid communication through the conduit. Lubricant in the reservoir is provided to the compression mechanism through the conduit.

5 Claims, 3 Drawing Sheets

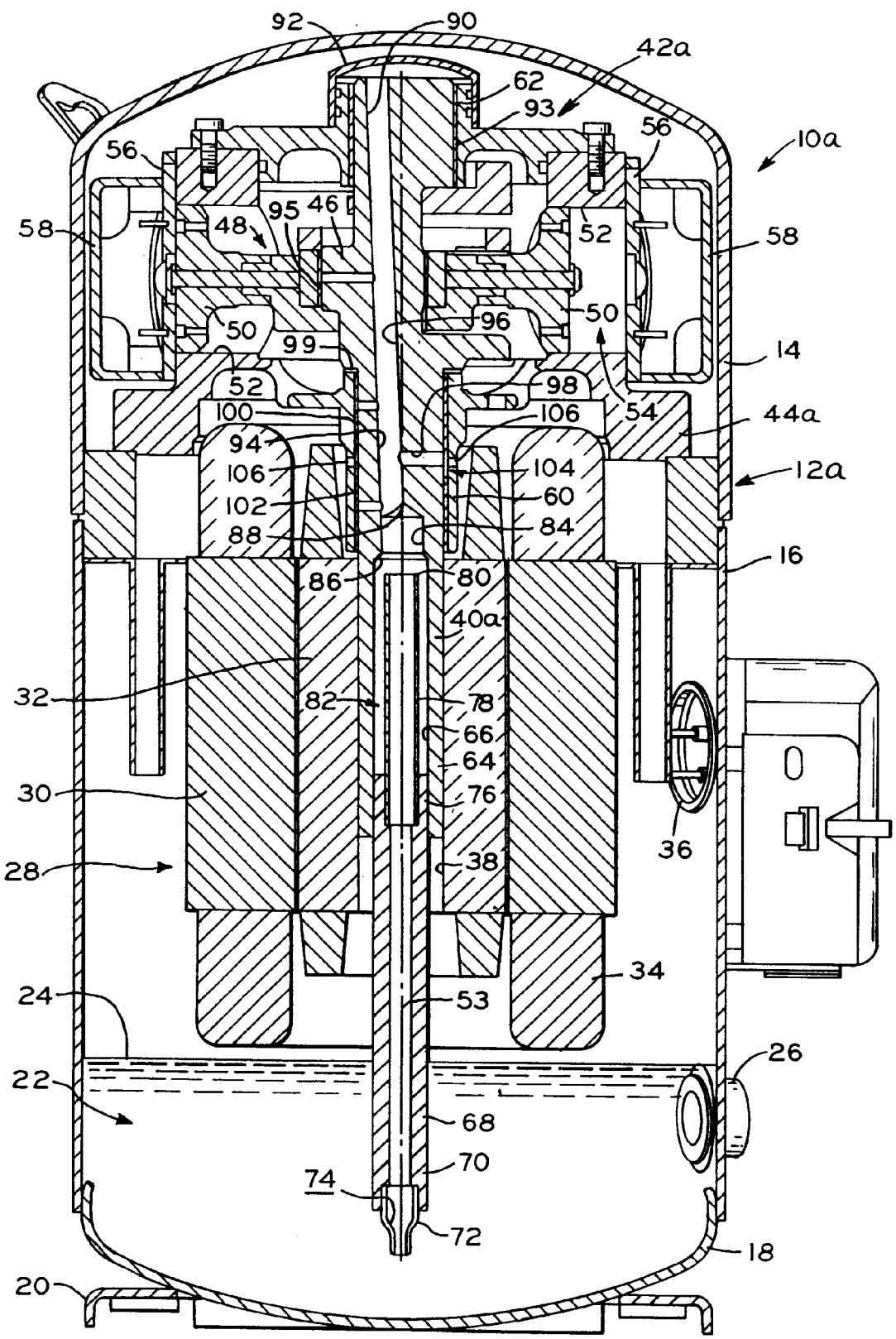
FIG_1

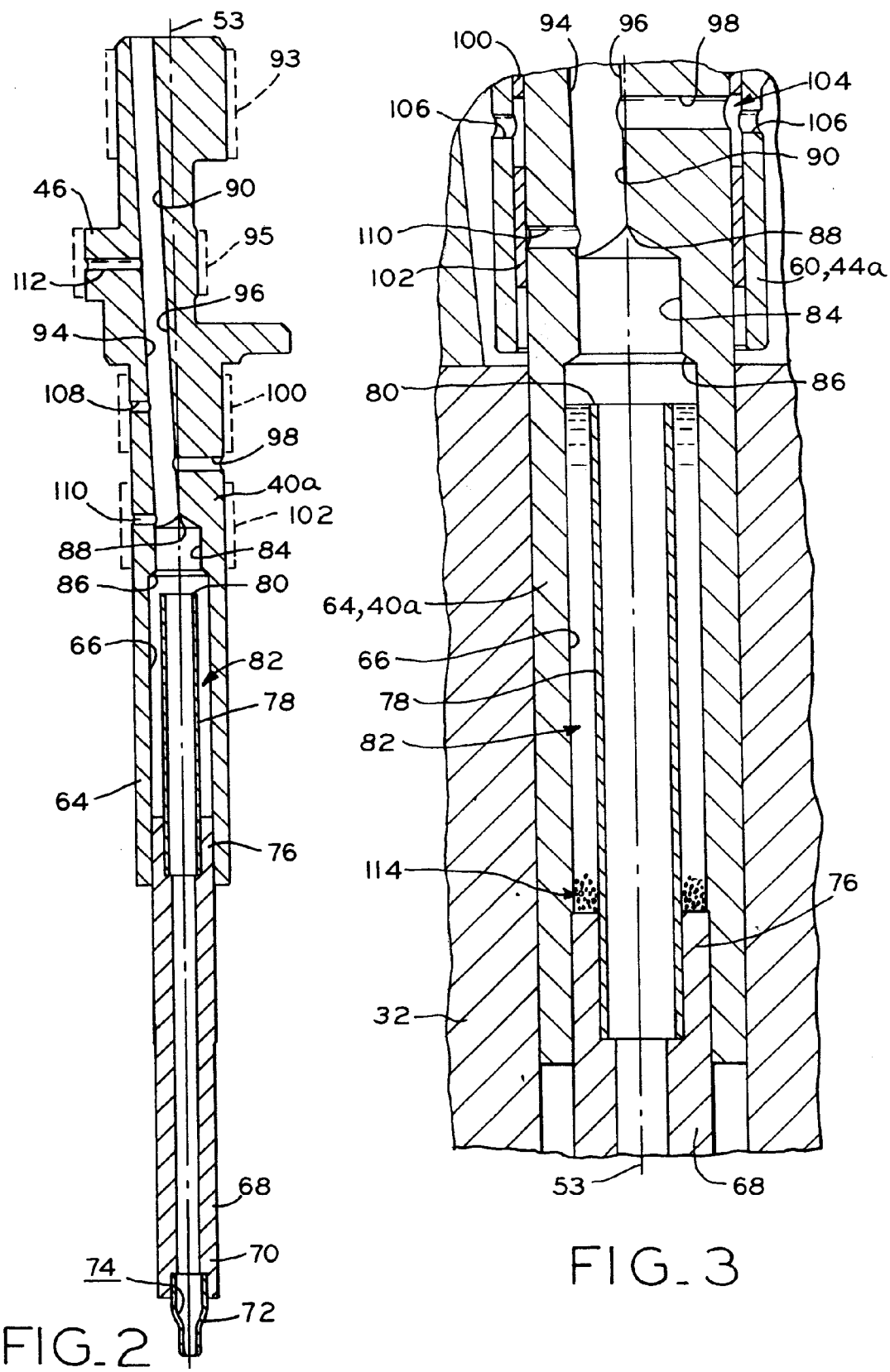

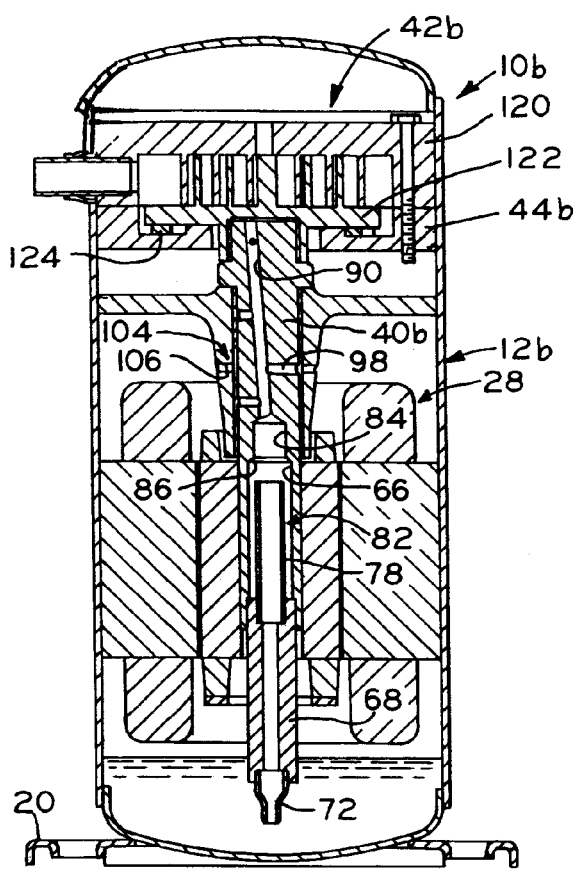
FIG_4
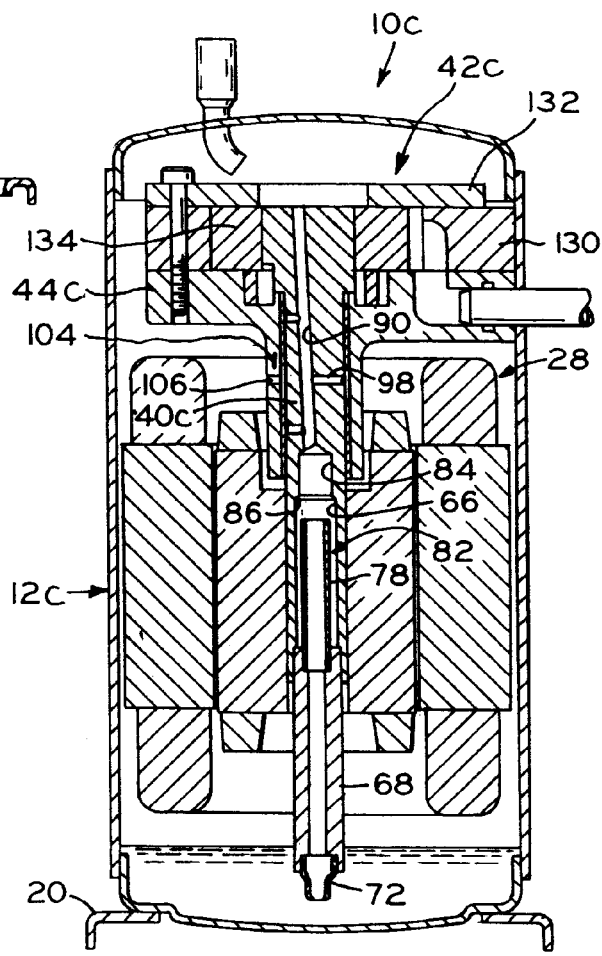
FIG_5

LUBRICATING SYSTEM FOR COMPRESSOR

BACKGROUND OF THE INVENTION

The present invention relates generally to hermetic compressor assemblies, particularly those having drive shafts which are substantially vertically oriented and, more particularly, to lubricating systems for such compressor assemblies.

Previous systems for supplying oil from a compressor sump located near the bottom of a compressor assembly to the lubricated bearings, which may be located near the top of the compressor assembly, have provided for conveying oil in a conduit which extends longitudinally through a rotating compressor drive shaft, perhaps nearly the full height of the compressor assembly on compressor start up. Ordinarily, the oil is driven upwards through this conduit by means of a centrifugal or positive displacement pump. Priming this conduit with oil from the sump takes time, and must be done each time the compressor starts up. This priming time may expose the bearings, particularly those bearings located near the top of the compressor, to periods during which no oil is being provided thereto. Consequently, the bearings may at least temporarily operate with a marginal or inadequate lubricating oil supply, stressing the bearings and leading to their premature wear and possible failure of the compressor. Notably, the bearings may be radial or thrust bearings, whether hydrodynamic or of any other kind (e.g., roller or ball type), and may be formed by any of a number of various interfacing surfaces; herein "bearing" should be generally interpreted as including any points provided with oil by a lubrication system.

Further, the oil being provided from the sump to the bearings often contains an amount of refrigerant. As the oil in the lubrication system experiences changes in pressure and/or temperature, the refrigerant is vaporized and flashed from the oil. The flashed refrigerant may form gas pockets through or past which oil flow is inhibited. The flashed refrigerant vapor may also be carried along with the oil flowing through the lubrication system, taking up space in the flow which the oil would otherwise occupy. It can thus be understood that refrigerant vapor in the lubrication system can inhibit the proper operation of the system, and result in an inadequate supply of oil being provided to the bearings.

Further, previous compressor lubrication systems often allow any debris (e.g., metal particles) present in the oil to be circulated with the oil to the bearings, which may deposit on and/or prematurely wear the bearing.

It is therefore desirable to provide a compressor lubrication system which shortens priming time on compressor startup, facilitates the removal of flashed refrigerant vapor from the oil, and prevents debris from reaching the bearings with the oil.

SUMMARY OF THE INVENTION

The present invention addresses the above-mentioned shortcomings of previous compressors having compressor lubrication systems which direct the oil flow substantially vertically from the sump to the bearings, and provides the above-mentioned desirable advantages over those compressors.

The present invention provides a compressor assembly including a housing, a compression mechanism disposed in the housing, a sump located in the housing, the sump containing liquid lubricant, a conduit extending between the compression mechanism and the sump, the compression mechanism and the sump being in fluid communication through the conduit, lubricant in the sump being provided to the compression mechanism through the conduit, and a reservoir containing liquid lubricant located between the compression mechanism and the sump. The reservoir is in fluid communication with the conduit, and the compression mechanism and the reservoir are in fluid communication through the conduit. Lubricant in the reservoir is provided to the compression mechanism through the conduit.

The present invention also provides a compressor assembly including a housing, a compression mechanism disposed in the housing, a sump located in the housing, the sump containing liquid lubricant, and a conduit extending between the compression mechanism and the sump. The compression mechanism and the sump are in fluid communication through the conduit, and lubricant in the sump is provided to the compression mechanism through the conduit. Also included are means in fluid communication with the conduit for storing liquid lubricant between the compression mechanism and the sump, and providing the stored lubricant to the compression mechanism through the conduit upon startup of the compressor assembly.

The present invention also provides a compressor assembly including a housing, a compression mechanism disposed in the housing, and a motor disposed in the housing and having a stator and a rotor, the rotor operably coupled to the compression mechanism. A sump is located in the housing, the sump containing liquid lubricant. A conduit is rotatably fixed to the rotor and extends between the compression mechanism and the sump, the compression mechanism and the sump are in fluid communication through the conduit, and lubricant in the sump is provided to the compression mechanism through the conduit. Also provided is a reservoir containing liquid lubricant located between the compression mechanism and the sump, and surrounding the conduit. The reservoir is in fluid communication with the conduit, and the compression mechanism and the reservoir are in fluid communication through the conduit. Lubricant in the reservoir is provided to the compression mechanism through the conduit.

BRIEF DESCRIPTION OF THE DRAWINGS

The above mentioned and other features and objects of this invention, and the manner of attaining them, will become more apparent and the invention itself will be better understood by reference to the following descriptions of embodiments of the invention taken in conjunction with the accompanying drawings, wherein:

FIG. 1 is a longitudinal sectional view of a reciprocating piston compressor according to a first embodiment of the present invention;

FIG. 2 is a longitudinal sectional view of the crankshaft assembly of the compressor of FIG. 1, showing the locations of its bearings in ghosted lines;

FIG. 3 is an enlarged fragmentary sectional view of the lubricating system of the compressor of FIG. 1;

FIG. 4 is a longitudinal sectional view of a scroll compressor according to a second embodiment of the present invention; and FIG. 5 is a longitudinal sectional view of a rotary compressor according to a third embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF THE INVENTION

Referring to FIG. 1, there is shown compressor assembly 10a, having housing 12a which is formed of top portion 14, center portion 16 and bottom portion 18. The housing portions are hermetically secured together as by welding or brazing. Mounting flange 20 is welded to the bottom portion 18 for mounting the compressor in a vertically upright position. Located in the bottom of housing 12a is oil sump 22, the surface of the oil therein identified at 24. Oil sight glass 26 may be provided in the sidewall of housing 12a monitoring the quantity of oil in sump 22.

Located within housing 12a is electric motor 28 having stator 30, and rotor 32 rotatably disposed within the stator. The stator is provided with windings 34 to which electrical power is supplied from an external power source (not shown) through terminal assembly 36 in a well-known manner to electromagnetically drive rotation of rotor 32. Rotor 32 has central aperture 38 into which is interference fitted drive shaft 40a.

Compressor 10a includes scotch yoke type reciprocating piston compression mechanism 42a driven by drive shaft 40a. Crankcase 44a of compression mechanism 42a is secured to the housing in any suitable, known manner, for example, by welding or shrink fitting. Stator 30 is also fixed to crankcase 44a. Drive shaft 40a is provided with eccentric portion 46 about which scotch yoke mechanism 48 is surroundingly engaged to impart reciprocating motion to pistons 50 within cylinder bores 52 as shaft eccentric portion 46 orbits about shaft axis of rotation 53. Scotch yoke mechanisms are well known in the art. Previous scotch,yoke type reciprocating piston compressor assemblies are disclosed in U.S. Pat. No. 4,838,769 (Gannaway), U.S. Pat. No. 4,842,492 (Gannaway), U.S. Pat. No. 5,288,211 (Fry), and U.S. Pat. No. 5,980,222 (Fry), each of which is assigned to the assignee of the present invention and expressly incorporated herein by reference.

Refrigerant gas substantially at suction pressure is received from a refrigerant system (not shown) and drawn into compression space 54 through suction passages extending through, and past check suction valves attached to, pistons 50. The gas compressed by the piston is exhausted at substantially discharge pressure through ports extending through, and past discharge check valves attached to, valve plates 56. Heads 58, attached, and retaining valve plates 56, to crankcase 44a, receive the compressed gas. The compressed gas is subsequently returned to the refrigerant system.

Drive shaft 40a is radially supported by bearing portion 60 provided in crankcase 44a, and outboard bearing 62 attached to crankcase 44a near the top of compressor assembly 10a. Lower portion 64 of drive shaft 40a, which is rotatably fixed to rotor 32, is provided with large diameter, longitudinal reservoir bore 66 having a longitudinal axis which coincides with the axis of rotation of the shaft. Pickup tube 68 is interference fitted into reservoir bore 66 and extends downwardly below oil surface level 24. Lower end 70 of pickup tube 68 is provided with an oil pump means of any suitable type for urging oil upwardly through the pickup tube. As shown, the oil pump means includes known centrifugal pump 72 which, as it rotates, forces oil received therein from sump 22 outward along its interior frustoconical surface 74 and upward along the pickup tube. Other known centrifugal pump embodiments, or known pumps of other types (e.g., a positive displacement pump) may also be employed for urging oil upwardly from sump 22 through pickup tube 68.

Upper end 76 of pickup tube 68 is provided with a counterbore into which is interference fitted reservoir tube 78. The exposed exterior surface of reservoir tube between upper end 76 of pickup tube 68, and its upper, free end 80 define the radially inner wall of oil reservoir 82. The radially outer wall of oil reservoir 82 is defined by reservoir bore 66 provided in the drive shaft. As will be more fully described below, oil reservoir 82 provides a source of oil which is, upon subsequent compressor startups, more readily available to the bearings. FIG. 3 shows in greater detail the structure which forms oil reservoir 82. Each time compressor assembly 10a is shut down after running, a cylindrical column of oil is contained in reservoir 82. Prior to subsequent compressor startups, the surface level of this oil is even with reservoir tube upper, free end 80. Further, as will also be more fully described below, oil reservoir 82 provides a trap in which debris carried by oil from sump 22 is deposited and retained, and prevented from being further circulated through the compressor assembly or the refrigerant system.

Drive shaft 40a is also provided with intermediate bore 84, adjacent and colinear with reservoir bore 66. The diameter of intermediate bore 84 is smaller than that of reservoir bore 66 and, as shown, the shoulder between these two diameters forms annular lip 86 having a frustoconical transition surface. Alternatively, the annular lip may be formed by a square shoulder (not shown) formed between bores 66 and 84. The terminal end of intermediate bore 84 has a conical shape, vertex 88 thereof centered on the shaft axis of rotation. Intersecting intermediate bore 84 at its terminal end, at a location radially offset from vertex 88, is the inlet end of slanted, longitudinally extending oil passageway 90. The opposite, outlet end of slanted passageway 90 opens to the axial surface of the end of shaft 40a which is radially supported by outboard bearing 62, as shown in FIG. 1. The slanted orientation of passageway 90 serves as a centrifugal pump, the oil therein urged upwardly as it is forced radially outward under the influence of centrifugal force during compressor operation.

The portion of outboard bearing 62 which surrounds the shaft end is provided with cap 92 sealingly secured to that outboard bearing portion. Oil which is discharged from the outlet end of slanted passageway 90 is contained by cap 92 and allowed to flow downward along the bearing 93 located in the interface between outboard bearing 62 and the portion of shaft 40a therein, thereby lubricating the bearing. Oil which has flowed along bearing 93 may proceed downward, into crankcase 44a and subsequently lubricate the piston/cylinder bore interfaces and the thrust bearing which axially supports shaft 40a.

The slanted orientation of passageway 90 defines radial sides thereof which may be characterized as "radially upper," i.e., that radial side which is nearest shaft axis of rotation 53, and "radially lower," i.e., that radial side which is furthest away from shaft axis of rotation 53. Radially lower side 94 of slanted passageway 90 is radially at or near the circumferential wall of intermediate bore 84; radially upper side 96 of slanted passageway 90 is radially at or near vertex 88. The oil urged upward through slanted passageway 90 under the influence of centrifugal force tends to flow along the radially lower side of the passageway.

As noted above, refrigerant contained in the oil may be flashed from the oil within the lubrication system. As the flashed vapor flows initially upwards through slanted passageway 90, it is received in vent passageway 98 which extends radially between upper radial surface 96 of passageway and the outside surface of shaft 40*a* radially supported by crankcase bearing portion 60. Because the oil tends to flow on the opposite radial side of slanted passageway 90, it will not tend to flow over vent passageway 98 and inhibit the entry of refrigerant vapor into the vent or its flow therethrough.

Drive shaft 40*a* is axially supported by crankcase bearing portion 60 via thrust bearing 99 (FIG. 1). A pair of axially-spaced bearings 100, 102 (FIGS. 1, 3) are located in the interface between crankcase bearing portion 60 and radially support the portion of shaft extending therethrough. Vent passageway 98 opens into annular space 104 (FIG. 3) located within crankcase bearing portion 60 bearing between bearing assemblies 100 and 102. A plurality of vent apertures 106 (FIG. 3) are provided through crankcase bearing portion 60, and provide free fluid communication between annular space 104 and the interior of housing 12*a*. Notably, flashed refrigerant vapor within the lubrication system is at a greater pressure than the interior of housing 12*a* into which apertures 106 open; the flashed refrigerant vapor therefore tends to flow from slanted passageway 90 to the interior of housing 12*a* through vent passageway 98, space 104 and apertures 106. Moreover, the refrigerant vapor within vent passageway 98 is urged radially outward under the influence of centrifugal force, which provides further inducement for the vapor to follow this venting flowpath.

Shaft 40*a* is provided with a series of oil conducting passageways which extend radially from lower radial side 94 of slanted passageway 90 to the outside surface of the shaft. Notably, oil conducting passageways 108, 110 respectively provide oil from slanted passageway 90 to bearings 100, 102. Radially extending passageway 112, crossbored through the eccentric portion of the shaft 40*a* and extends from the outer cylindrical surface of the shaft eccentric portion 46 to lower radial side 94 of slanted passageway 90 to lubricate bearing 95 located at the interface between the eccentric portion and scotch yoke mechanism 48. Alternatively to what is shown in FIGS. 1 and 3, oil conveying passageway 112 may be crossbored completely through shaft eccentric portion 46 in a direction 90° relative to that in which shown passageway 112 extends, communicating lower radial side 94 of slanted passageway 90 and bearing 95. Pickup tube 68, reservoir tube 78, intermediate bore 84 and slanted passageway 90 thus form a conduit extending between sump 22 and compression mechanism 42*a* through which oil in the sump is provided to the compression mechanism for lubrication of the compression mechanism. The conduit also includes the upper portion of reservoir bore 66, particularly that portion located axially above upper, free end 80 of reservoir tube 78.

Upon initial operation of compressor assembly 10*a*, oil urged upward through pickup tube 68 and reservoir tube 78 spills radially outward over upper, free end 80 of tube 78 and into reservoir 82. Under the influence of centrifugal force, this oil is forced outward to the wall of reservoir bore 66, and eventually is forced upward, over annular lip 86, into onto the circumferential surface of intermediate bore 84, and into slanted passageway 90. Notably, debris contained in the oil, which is forced outwardly against the wall of reservoir bore 66 under the influence of centrifugal force, will tend not to flow with the oil upward over lip 86, which forms a hurdle or strainer over which the debris, particularly the heavier portions thereof, forced outward to the wall of reservoir bore 66 under the influence of centrifugal force, cannot flow with the upwardly flowing oil. During compressor operation, the debris is slung radially outwardly, toward the circumferential wall of reservoir bore 66, below lip 86, and does not enter intermediate bore 84 or slanted passageway 90. Once the compressor stops, debris collected below lip 86 will fall, or be carried by downwardly flowing oil, into reservoir 82, wherein it will be deposited and retained.

During compressor operation, the oil, substantially strained of debris by lip 86, proceeds upward along slanted passageway 90, flowing along lower radial side thereof, and portions of this oil are sequentially received in oil passageways 110, 108 and 112, providing lubrication of the bearings associated therewith. The oil then reaches the outlet end of slanted passageway 90 and directed by cap 92 downward and into the bearing interface between the shaft and outboard bearing 62. Any vapor flashed from the oil will, as described above, tend to enter vent passageway 98 and be returned to the interior of housing 12*a*.

Upon shutdown, oil throughout the lubrication system will begin to drain downward under gravity. Oil in slanted passageway 90 will flow downward, under the influence of gravity, along the walls thereof, particularly along lower radial side 94. As noted above, lower radial side extends to or near the circumferential surface of intermediate bore 84; the downwardly flowing oil thus adheres to and flows downwardly along the wall of intermediate bore 84 and transition surface 86 to the wall of reservoir bore 66. The oil continues to flow downward along the wall of reservoir bore 66 until oil reservoir 82 is full. Debris blocked from upward travel by lip 86 flows into the bottom of reservoir 82, wherein it is deposited and retained, and prevented from being further circulated through the compressor assembly or the refrigerant system. Any further downwardly flowing oil will spill over free end 80 of reservoir tube 78, and continue downward through reservoir tube 78 and pickup tube 68 toward sump 22.

Now, upon each subsequent startup, oil in reservoir 82, which is located above sump 22 and closer to the bearings, is available to more immediately prime the lubricating system and provide oil to the bearings. As the compressor starts, centrifugal force urges the oil in reservoir 82 outward and upward, out of the reservoir. Meanwhile, oil begins to rise upward through pickup tube 68 and reservoir tube 78 from sump 22. The oil from reservoir 82, which is now added to the oil rising from the sump, primes the lubricating system more quickly than oil pump 72 otherwise could alone. As before, any debris still in the oil is blocked by lip 86 from proceeding with the oil further upwards, and is eventually trapped at the bottom of reservoir 82, as shown at 114 (FIG. 3).

Lip 86 may also facilitate flashing of refrigerant vapor from the oil as the oil traverses its sharp corner between its frustoconical transition surface and intermediate bore 84, or the sharp corner between the lip and bore 84 should the lip be alternatively formed of a square shoulder (not shown), as noted above. This flashed refrigerant vapor, along with any other refrigerant vapor flashed within the lubricating system, will be vented through passageway 98 to the interior of housing 12*a*.

Referring now to FIG. 4, there is shown scroll compressor assembly 10*b* having housing 12*b*, which is similar to housing 12a of compressor assembly 10a, within which is disposed compression mechanism 42b. Compression mechanism 42b includes frame 44b attached to fixed scroll member 120 having an involute wrap. Orbiting scroll member 122 having an involute wrap is located between the frame and the fixed scroll member, the fixed and orbiting members' involute wraps interleaved. As is well known in the art, the orbiting scroll member is orbited relative to the fixed scroll member, and refrigerant gas substantially at suction pressure is received in compression mechanism 42b, compressed between the interleaved wraps, and discharged at substantially discharge pressure from the compression mechanism. Previous scroll compressor assemblies are disclosed in U.S. Pat. No. 4,875,838 (Richardson, Jr.), U.S. Pat. No. 5,306,126 (Richardson, Jr.) and U.S. Pat. No. 6,086,342 (Utter), each of which is assigned to the assignee of the present invention and expressly incorporated herein by reference.

Compressor assembly 10b includes also includes motor 28 as described above, which drives orbiting scroll member 122 via drive shaft 40b, which is substantially similar to shaft 40a except that its eccentric portion, which drives orbiting scroll member 122, is at one terminal end thereof. Oldham coupling 124 is provided to prevent rotation of orbiting scroll member 122 with shaft 40b. Functionally, the lubrication system of compressor assembly 10b operates in the same way as that of compressor assembly 10a, and has nearly identical structural aspects.

Referring now to FIG. 5, there is shown rotary compressor assembly 10c having housing 12c, which is similar to housing 12a of compressor assembly 10a, within which is disposed compression mechanism 42c. Compression mechanism 42c includes main bearing 44c attached to which is cylinder 130 and outboard bearing 132, a compression space defined between the interior cylindrical surface of the cylinder, the exterior cylindrical surface of roller piston 134, and the sides of a vane (not shown) which extends between these two cylindrical surfaces. As is well known in the art, the roller piston is orbited relative to the cylinder, and line contact is maintained between the cylinder and piston. Refrigerant gas substantially at suction pressure is received in compression mechanism 42c, at one side of the vane, compressed between the cylinder, piston and vane, and discharged at the opposite side of the vane at substantially discharge pressure from the compression mechanism. Previous rotary compressor assemblies are disclosed in U.S. Pat No. 4,889,475 (Gannaway et al.) and U.S. Pat No. 5,236,318 (Richardson, Jr.), each of which is assigned to the assignee of the present invention and expressly incorporated herein by reference.

Compressor assembly 10c includes also includes motor 28 as described above, which drives roller piston 134 via drive shaft 40c, which is substantially similar to shaft 40a except that its eccentric portion, which drives piston 134, is at one terminal end thereof. Functionally, the lubrication system of compressor assembly 10c operates in the same way as that of compressor assembly 10a, and has nearly identical structural aspects.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A compressor assembly comprising:

a housing;

a compression mechanism disposed in said housing;

a sump located in said housing, said sump containing liquid lubricant;

a conduit extending between said compression mechanism and said sump, said compression mechanism and said sump being in fluid communication through said conduit, the liquid lubricant in said sump being provided to said compression mechanism through said conduit;

a rotatable reservoir containing liquid lubricant and located between said compression mechanism and said sump, said reservoir being in fluid communication with said conduit, said compression mechanism and said reservoir being in fluid communication through said conduit, the liquid lubricant in said reservoir being provided to said compression mechanism through said conduit;

an electric motor disposed in said housing, said motor comprising a stator and a rotor, said rotor being operably coupled to said compression mechanism, said conduit rotatably fixed to said rotor; and a drive shaft rotatably fixed to said rotor, said drive shaft having an axis of rotation, said compression mechanism and said rotor being operably coupled through said drive shaft, said drive shaft having a longitudinally extending reservoir bore therein; and a pickup tube connected to said drive shaft and extending between said reservoir bore and said sump, said conduit comprising said pickup tube; and wherein said drive shaft has an outer surface and a longitudinally extending passageway therein, said longitudinally extending passageway being slanted relative to said axis of rotation, said conduit comprises said longitudinally extending passageway and at least one liquid lubricant conveying passageway extending substantially radially through said drive shaft between said longitudinally extending passageway and said drive shaft outer surface, said compression mechanism is provided with liquid lubricant through said at least one liquid lubricant conveying passageway, said conduit has a lip located between said reservoir bore and said longitudinally extending passageway, liquid lubricant being conveyed to said longitudinally extending passageway from said reservoir bore is flowed over said lip, a strainer is established by said lip, debris contained in the liquid lubricant being conveyed to said longitudinally extending passageway is strained therefrom at said lip, and said lip is substantially annular and located entirely below said longitudinally extending passageway.

2. The compressor assembly of claim 1, said wherein said lip has a substantially frustoconical surface.

3. A compressor assembly comprising;

a housing;

a compression mechanism disposed in said housing;

a sump located in said housing, said sump containing liquid lubricant;

a conduit extending between said compression mechanism and said sump, said compression mechanism and said sump being in fluid communication through said conduit, the liquid lubricant in said sump being provided to said compression mechanism through said conduit;

a rotatable reservoir containing liquid lubricant and located between said compression mechanism and said sump, said reservoir being in fluid communication with said conduit, said compression mechanism and said reservoir being in fluid communication through said conduit, the liquid lubricant in said reservoir being provided to said compression mechanism through said conduit;

an electric motor disposed in said housing, said motor comprising a stator and a rotor, said rotor being operably coupled to said compression mechanism, said conduit rotatably fixed to said rotor; and a drive shaft rotatably fixed to said rotor, said drive shaft having an axis of rotation, said compression mechanism and said rotor being operably coupled through said drive shaft, said drive shaft having a longitudinally extending reservoir bore therein; and a pickup tube connected to said drive shaft and extending between said reservoir bore and said sump, said conduit comprising said pickup tube; and wherein said drive shaft has an outer surface and a longitudinally extending passageway therein, said longitudinally extending passageway being slanted relative to said axis of rotation, said conduit comprises said longitudinally extending passageway and at least one liquid lubricant conveying passageway extending substantially radially through said drive shaft between said longitudinally extending passageway and said drive shaft outer surface, said compression mechanistic is provided with liquid lubricant through said at least one liquid lubricant conveying passageway, said conduit has a lip located between said reservoir bore and said longitudinally extending passageway, liquid lubricant being conveyed to said longitudinally extending passageway from said reservoir bore is flowed over said lip, a strainer is established by said lip, debris contained in the liquid lubricant being conveyed to said longitudinally extending passageway is strained therefrom at said lip, an intermediate bore is located between said reservoir bore and said longitudinally extending passageway, said lip extending between said reservoir bore and said intermediate bore, and said intermediate bore has terminal end, said intermediate bore terminal end defining a cone having a vertex, said vertex substantially coinciding with said drive shaft axis of rotation.

4. The compressor assembly of claim 3, wherein said longitudinally extending passageway intersects said intermediate bore at said intermediate bore terminal end.

5. The compressor assembly of claim 4, wherein said longitudinally extending passageway intersects said intermediate bore terminal end at a location radially offset from said vertex.

* * * * *

UNITED STATES PATENT AND TRADEMARK OFFICE
CERTIFICATE OF CORRECTION

PATENT NO.     : 6,527,085 B1
DATED          : March 4, 2003
INVENTOR(S)    : Andrew W. Paczuski It is certified that error appears in the above-identified patent and that said Letters Patent is hereby corrected as shown below:

Column 8,
Line 54, delete "said" after ","

Column 10,
Line 2, delete "mechanistic" and substitute therefor -- mechanism --
Line 16, after "has" insert -- a --

Signed and Sealed this

Sixth Day of May, 2003

JAMES E. ROGAN
*Director of the United States Patent and Trademark Office*